United States Patent
Lin (10) Patent No.: US 11,678,361 B2
(45) Date of Patent: Jun. 13, 2023

(54) TRANSMISSION PRIORITIZATION MECHANISM FOR DETERMINING BETWEEN SIDELINK TRANSMISSIONS AND UPLINK TRANSMISSIONS IN WIRELESS COMMUNICATION SYSTEM

(71) Applicant: MEDIATEK INC., Hsinchu (TW)

(72) Inventor: Guan-Yu Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 278 days.

(21) Appl. No.: 17/005,555

(22) Filed: Aug. 28, 2020

(65) Prior Publication Data
US 2021/0105790 A1 Apr. 8, 2021

Related U.S. Application Data

(60) Provisional application No. 62/931,954, filed on Nov. 7, 2019, provisional application No. 62/912,711, filed
(Continued)

(51) Int. Cl.
*H04W 74/00* (2009.01)
*H04W 72/56* (2023.01)
(Continued)

(52) U.S. Cl.
CPC ....... *H04W 72/56* (2023.01); *H04W 72/0446* (2013.01); *H04W 72/25* (2023.01); *H04W 72/40* (2023.01); *H04W 74/004* (2013.01)

(58) Field of Classification Search
CPC ............. H04B 17/1027; H04J 11/0023; H04L 27/2691; H04W 52/0238; H04W 72/25;
(Continued)

(56) References Cited

U.S. PATENT DOCUMENTS

2018/0234995 A1* 8/2018 Jung ................... H04W 72/569
2021/0153065 A1* 5/2021 Adjakple .......... H04W 28/0263
(Continued)

FOREIGN PATENT DOCUMENTS

| EP | 3826356 A1 * | 5/2021 | ............ H04W 28/02 |
| EP | E P-3962216 A1 * | 3/2022 | ........ H04W 72/1231 |
| KR | 20210019750 A * | 2/2021 | ............ H04W 28/24 |

OTHER PUBLICATIONS

English Translation for KR-20210019750-A (which is cited in the Foreign Patent Documents under the letter O) (Year: 2022).*
"3GPP TS 36.321 v15.2.0", Jul. 2018 pp. 1-127 (Year: 2018).*

*Primary Examiner* — Salvador E Rivas
(74) *Attorney, Agent, or Firm* — Oblon, McClelland, Maier & Neustadt, L.L.P.

(57) ABSTRACT

A method includes receiving an UL prioritization threshold and a SL prioritization threshold at a user equipment (UE), and determining whether an UL transmission overlaps a SL transmission in time domain. When the UL transmission overlaps the SL transmission in time domain, which of the UL transmission and the SL transmission is to be prioritized is determined based on the UL prioritization threshold and the SL prioritization threshold, and logical channel (LCH) priorities associated with the UL transmission and the SL transmission. The method can further includes performing one of the UL transmission and the SL transmission that is prioritized.

20 Claims, 6 Drawing Sheets

Related U.S. Application Data on Oct. 9, 2019, provisional application No. 62/909,834, filed on Oct. 3, 2019.

(51) Int. Cl.
*H04W 72/0446* (2023.01)
*H04W 72/25* (2023.01)
*H04W 72/40* (2023.01)

(58) Field of Classification Search
CPC .......................... H04W 72/40; H04W 72/1284; H04W 74/004
See application file for complete search history.

(56) References Cited

U.S. PATENT DOCUMENTS

2021/0377956 A1* 12/2021 Lee ..................... H04W 72/541
2022/0279537 A1*  9/2022 Freda ................ H04W 72/1263

* cited by examiner

TRANSMISSION PRIORITIZATION MECHANISM FOR DETERMINING BETWEEN SIDELINK TRANSMISSIONS AND UPLINK TRANSMISSIONS IN WIRELESS COMMUNICATION SYSTEM

INCORPORATION BY REFERENCE

This present application claims the benefit of U.S. Provisional Application No. 62/909,834, "Methods to Prioritize Uplink and Sidelink Transmission" filed on Oct. 3, 2019, No. 62/912,711, "Mechanism to Support Sidelink Resource Allocation and Prioritization" filed on Oct. 9, 2019, and No. 62/931,954, "Principle to Handle Transmission Prioritization for Sidelink Communication" filed on Nov. 7, 2019. The disclosures of the prior applications are incorporated herein by reference in their entirety.

TECHNICAL FIELD

The present disclosure relates to wireless communications, and specifically relates to vehicle-to-everything (V2X) sidelink communications.

BACKGROUND

Cellular based vehicle-to-everything (V2X) (e.g., LTE V2X or NR V2X) is a radio access technology developed by the 3rd Generation Partnership Project (3GPP) to support advanced vehicular applications. In V2X, a direct radio link (referred to as a sidelink) can be established between two vehicles. The sidelink can operate under the control of a cellular system (e.g., radio resource allocation being controlled by a base station) when the vehicles are within the coverage of the cellular system. Or, the sidelink can operate independently when no cellular system is present.

SUMMARY

Aspects of the disclosure provide a method of prioritization between uplink (UL) and sidelink (SL) transmissions. The method can include receiving an UL prioritization threshold and a SL prioritization threshold at a user equipment (UE), and determining whether an UL transmission overlaps a SL transmission in time domain. When the UL transmission overlaps the SL transmission in time domain, which of the UL transmission and the SL transmission is to be prioritized is determined according to: when a highest priority of an UL logical channel(s) (LCH(s)) with UL data available for the UL transmission is lower than a priority corresponding to the UL prioritization threshold, and a highest priority of a SL LCH(s) with SL data available for the SL transmission is higher than a priority corresponding to the SL prioritization threshold, prioritizing the SL transmission over the UL transmission, and when the highest priority of the UL LCH(s) with the UL data available for the UL transmission is higher than the priority corresponding to the UL prioritization threshold, or the highest priority of the SL LCH(s) with the SL data available for the SL transmission is lower than the priority corresponding to the SL prioritization threshold, prioritizing the UL transmission over the SL transmission. The method can further includes performing one of the UL transmission and the SL transmission that is prioritized.

In an embodiment, when the highest priority of the UL LCH(s) with the UL data available for the UL transmission is higher than the priority corresponding to the UL prioritization threshold, classifying the UL data available for the UL transmission into UL data class 1. When the highest priority of the UL LCH(s) with the UL data available for the UL transmission is lower than the priority corresponding to the UL prioritization threshold, classifying the UL data available for the UL transmission into UL data class 2. When the highest priority of the SL LCH(s) with the SL data available for the SL transmission is higher than the priority corresponding to the SL prioritization threshold, classifying the SL data available for the SL transmission into SL data class 1. When the highest priority of the SL LCH(s) with the SL data available for the SL transmission is lower than the priority corresponding to the SL prioritization threshold, classifying the SL data available for the SL transmission into SL data class 2. Which of the UL transmission and the SL transmission is to be prioritized can be determined according to priorities of the UL data and the SL data that are determined based on the following priority order where the highest priority is listed first: data belonging to UL data class 1, data belonging to SL data class 1, data belonging to UL data class 2, and data belonging to SL data class 2.

In an embodiment, priorities of the UL LCHs with the UL data available for the UL transmission are represented by values with a lower value corresponding to a higher priority, and priorities of the SL LCHs with the SL data available for the SL transmission are represented by values with a lower value corresponding to a higher priority.

In an embodiment, when a value of the highest priority of the UL LCH(s) with the data available for the UL transmission is higher than the UL prioritization threshold, and a value of the highest priority of the SL LCHs with the data available for the SL transmission is lower than the SL prioritization threshold, the SL transmission can be prioritized over the UL transmission. When the value of the highest priority of the UL LCHs with the data available for the UL transmission is lower than the UL prioritization threshold, or the value of the highest priority of the SL LCHs with the data available for the SL transmission is higher than the SL prioritization threshold, the UL transmission can be prioritized over the SL transmission.

In an embodiment, data from a SL control channel (SCCH) is prioritized over data from a SL traffic channel (STCH) for allocation of sidelink resources among the SL LCH(s).

An embodiment of the method can further include when both an UL buffer status report (BSR) and a SL BSR are triggered, classifying a SL logical channel group (LCG) as a prioritized SL LCG when a highest priority of one or more LCHs that belong to the SL LCG and have data available for transmission is higher than the priority corresponding to the SL prioritization threshold, and when a highest priority of one or more LCHs that belong to one or more UL LCGs having buffer status to be reported and have data available for transmission is lower than the priority corresponding to the UL prioritization threshold, prioritizing buffer status reporting of the prioritized SL LCG over buffer status reporting of the one or more UL LCGs.

In an embodiment, to prioritize the buffer status reporting of the prioritized SL LCG, a SL-BSR medium access control (MAC) control element (CE) containing buffer status of the prioritized SL LCG can be included in an UL MAC PDU, and an UL-BSR MAC CE containing all or a subset of buffer status of the one or more UL LCGs can be included in the UL MAC PDU.

Another embodiment of the method can include when an UL transmission including ultra-reliable low-latency communication (URLLC) data overlaps in time domain a SL transmission including a physical sidelink feedback channel (PSFCH) or a physical sidelink broadcast channel (PSBCH), prioritizing the SL transmission including the PSFCH or the PSBCH over the UL transmission including the URLLC data when the PSFCH or the PSBCH is associated with SL data having a highest priority of LCHs including data in the SL data that is higher than a SL URLLC prioritization threshold, and prioritizing the UL transmission including the URLLC data over the SL transmission including the PSFCH or the PSBCH when the PSFCH or the PSBCH is associated with SL data having a highest priority of LCHs including data in the SL data that is lower than the SL URLLC prioritization threshold.

Another embodiment of the disclosure include prioritizing an UL transmission including a MAC protocol data unit (PDU) over a SL transmission overlapping the UL transmission in time domain when the MAC PDU includes one of:
- an UL BSR MAC CE,
- a SL BSR MAC CE,
- a power headroom report (PHR) MAC CE,
- a common control channel (CCCH) service data unit (SDU),
- a radio resource control (RRC) message,
- a signaling radio bearer (SRB) message,
- a cell radio network temporary identifier (C-RNTI) MAC CE,
- a third message (Msg3) of a random access process,
- a beam failure recovery request (BFRQ) for a secondary cell MAC CE, or
- a configured grant confirmation MAC CE.

An embodiment of the disclosure further includes triggering a SL scheduling request (SR) for a SL BSR triggered by a SL LCH when an available UL resource has a physical uplink shared channel (PUSCH) transmission duration longer than a maximum PUSCH duration configured for the SL LCH triggering the SL BSR.

In an embodiment, a priority of an UL SR equals a priority of an UL LCH triggering the UL SR for prioritizing between the UL SR and a SL transmission. In an embodiment, a priority of a SL SR equals a priority of a SL LCH triggering the SL SR for prioritizing between the SL SR and a SL transmission, or for prioritizing between the SL SR and an UL transmission.

Aspects of the disclosure provide an apparatus. The apparatus can include circuitry configured to receive an UL prioritization threshold and a SL prioritization threshold, and determine whether an UL transmission overlaps a SL transmission in time domain. The circuitry can further be configured to, when the UL transmission overlaps the SL transmission in time domain, determine which of the UL transmission and the SL transmission is to be prioritized according to: when a highest priority of an UL logical channel(s) (LCH(s)) with UL data available for the UL transmission is lower than a priority corresponding to the UL prioritization threshold, and a highest priority of a SL LCH(s) with SL data available for the SL transmission is higher than a priority corresponding to the SL prioritization threshold, prioritizing the SL transmission over the UL transmission; and when the highest priority of the UL LCH(s) with the UL data available for the UL transmission is higher than the priority corresponding to the UL prioritization threshold, or the highest priority of the SL LCH(s) with the SL data available for the SL transmission is lower than the priority corresponding to the SL prioritization threshold, prioritizing the UL transmission over the SL transmission. The circuitry can further be configured to perform one of the UL transmission and the SL transmission that is prioritized.

Aspects of the disclosure provide a non-transitory computer-readable medium storing instructions that, when executed by a processor, cause the processor to perform the method of prioritization between UL and SL transmissions.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

I. Communications Via Sidelink and Uplink

Figure 1:
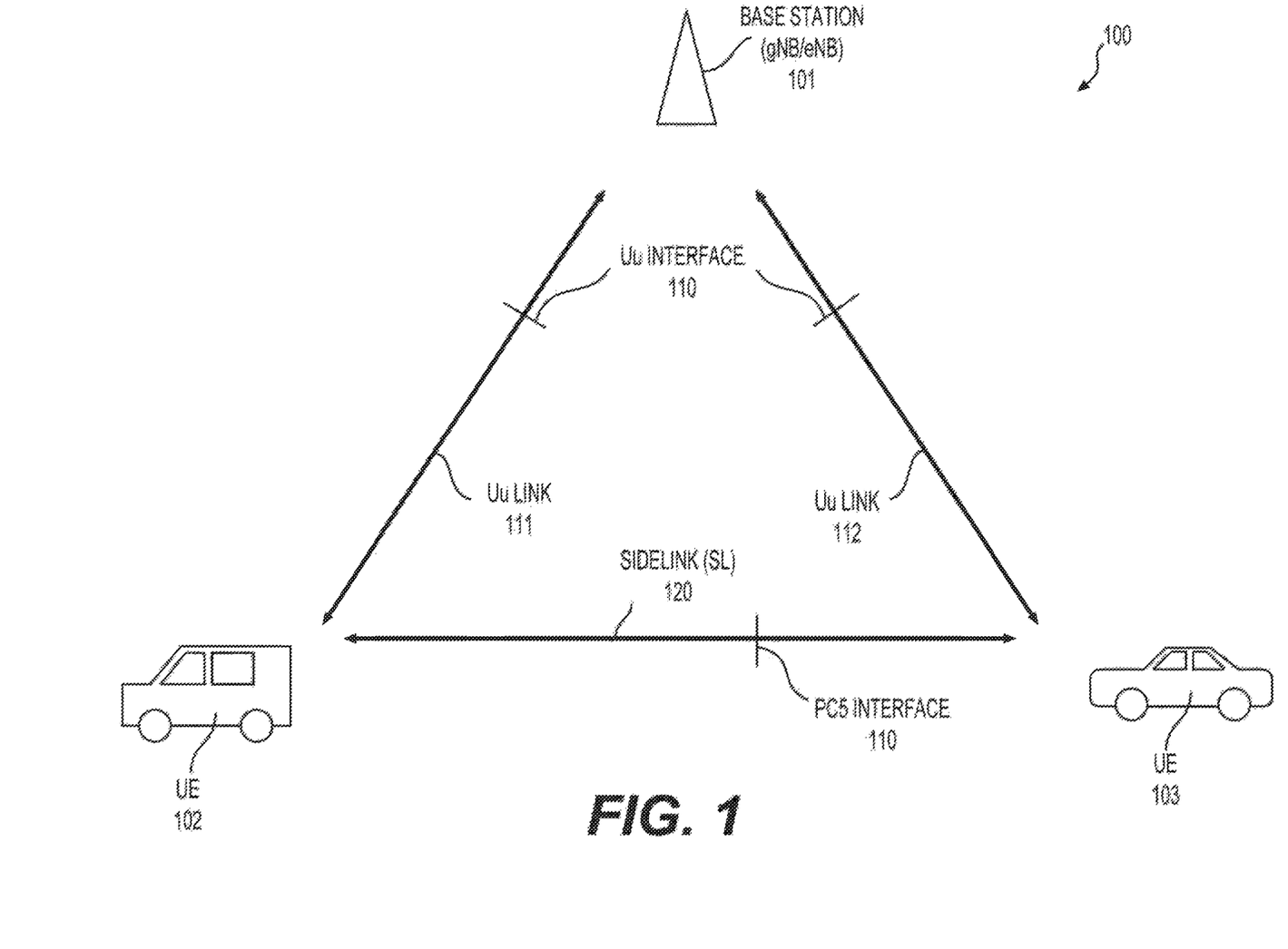
FIG. 1 shows a wireless communication system 100 according to an embodiment of the disclosure.

FIG. 1 shows a wireless communication system 100 according to an embodiment of the disclosure. The system 100 can include a base station (BS) 101, a first user equipment (UE) 102, and a second UE 103. The BS 101 can be an implementation of a gNB specified in the 3rd Generation Partnership Project (3GPP) New Radio (NR) standards, or can be an implementation of an eNB specified in 3GPP Long Term Evolution (LTE) standards. Accordingly, the BS 101 can communicate with the UE 102 or 103 via a radio air interface 110 (referred to as a Uu interface 110) according to respective wireless communication protocols. In other examples, the BS 101 may implement other types of standardized or non-standardized radio access technologies, and communicate with the UE 102 or 103 according to the respective radio access technologies. The UE 102 or 103 can be a vehicle, a computer, a mobile phone, a roadside unit, and the like.

The UEs 102 and 103 can communicate with each other based on vehicle-to-everything (V2X) technologies, for example, as specified in 3GPP LTE or fifth generation (5G) standards. A direct radio link 120, referred to as a sidelink (SL), can be established between the UEs 102 and 103 over an interface 110 (referred to as a PC5 interface). The SL 120 in FIG. 1 can be either a SL from the UE 102 to the UE 103, or a SL from the UE 103 to the UE 102. For the UE 102, uplink (UL) transmissions over a Uu link 111 and SL transmissions over the SL 120 can share a same spectrum (e.g., a same component carrier). Similarly, for the UE 103, UL transmissions over a Uu link 112 and SL transmissions over the SL 120 can share a same spectrum (e.g., a same component carrier).

Different from the FIG. 1 example (in-coverage scenario) where the UEs 102 and 103 performing SL communications are under network coverage (the coverage of a cell of the BS 101), in other examples, UEs performing SL communications can be outside of network coverage. For example, a SL can be established between two UEs both of which are located outside of network coverage (out-of-coverage scenario), or one of which is located outside of network coverage (partial-coverage scenario).

In some examples, a group of UEs (such as the UEs 102 and 103 and other UEs (not shown)) in a local area may communicate with each other using SLs under or without control of a base station. Each UE in the group may periodically or aperiodically transmits messages to neighboring UEs. In addition, the respective transmissions can be of a type of unicast, groupcast, or broadcast. For example, hybrid automatic repeat request (HARQ) and link adaptation mechanisms can be employed to support unicast or groupcast between a transmission (Tx) UE and a reception UE(s).

Figure 2:
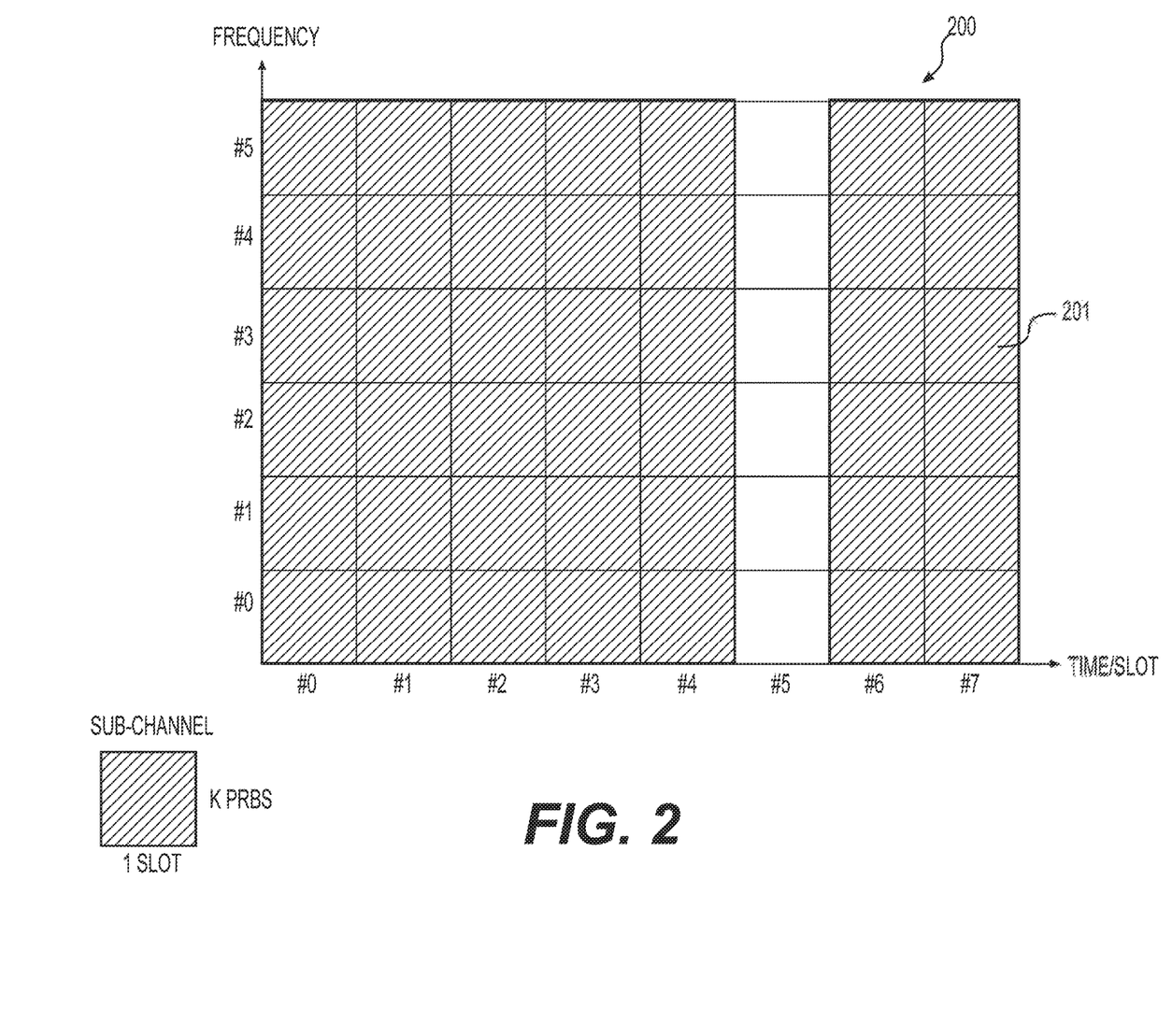
FIG. 2 shows an example of a resource pool 200 configured for sidelink (SL) communications according to an embodiment of the disclosure.

In various examples, allocation of radio resources over the SL 120 can be controlled by the BS 101 or can be performed by the UEs 102 or 103 autonomously based on resource pools. FIG. 2 shows an example of a resource pool 200 configured for SL communications according to an embodiment of the disclosure. For example, the resource pool 200 can be configured to the UE 102 from the BS 101, or can be pre-configured to the UE 102 (e.g., a resource pool configuration is stored in a universal integrated circuit card (UICC) of the UE 102). Radio resources for transmission of physical channels (e.g., physical SL control channel (PSCCH), physical SL shared channel (PSSCH), physical SL feedback channel (PSFCH), and the like) from the UE 102 on the SL 120 can be allocated based on the resource pool 200.

The resource pool 200 can be divided into sub-channels 201. Resource allocation, sensing, and resource selection can be based on units of a sub-channel. In an embodiment, each sub-channel 201 can have a size of 1 slot in time domain, and a size of N consecutive PRBs in frequency domain. For example, the number N can be 5, 10, 15, 20, 25, 50, 75, or the like. As shown in FIG. 2, the resource pool 200 can include a number of sub-channels (indexed #0-#5) in frequency domain, and a number of slots (e.g., slots #0-#4 and #6-#7) in time domain. The number of slots in time domain or the number of sub-channels in frequency domain can be consecutive or non-consecutive in different examples. Resource pools can be (pre-)configured to the UE 102 separately from the transmission perspective (Tx pools) and the reception perspective (Rx pools).

In an embodiment, within each of the slots of the resource pool 200, there can be from 7 to 14 of the symbols reserved for SL operation, of which a PSSCH can be transmitted in 5 to 12 symbols, respectively. The remaining SL symbols in each slot (not used for PSSCH transmission) can transmit physical SL feedback channel (PSFCH), automatic gain control (AGC) symbol(s), guard period (GP) symbol(s), or UL or downlink (DL) symbols. A slot may have different duration depending on respective sub-carrier spacings.

In an embodiment, two resource allocation modes (Mode 1 and Mode 2) can be used for allocating radio resources for PSCCH and PSSCH transmissions over a SL. In Mode 1, the BS 101 performs the function of resource scheduling. For example, the BS 101 can provide dynamic grants of SL resources, or semi-statically configured grants of periodic SL resources (referred to as SL configured grants) to the UE 102 for SL communications over the SL 120.

When the UE 102 is in an out-of-coverage status, or the UE 102 is in an in-coverage status but instructed by the BS 101, Mode 2 can be employed for resource scheduling (resource allocation). In Mode 2, the UE 102 can autonomously select resources for SL transmissions based on a sensing procedure. For example, the UE 102 can sense, within a (pre-)configured resource pool, which resources are not in use by other UEs with higher-priority traffic, and select an appropriate amount of resources for SL initial transmissions and, optionally, retransmissions. For example, according to priorities of the traffic (e.g., priorities associated with respective transport blocks) of the sensing UEs and the other transmitting UEs, a higher priority transmission from the sensing UE 102 can occupy resources which are reserved by a transmitting UE with lower-priority traffic.

In some embodiments, two-stage SCI is employed for SL transmission. For example, a PSCCH and a PSSCH associated with the PSCCH can be generated and transmitted from the UE 102. The PSCCH can carry a 1st-stage SCI, while the PSSCH can carry a 2nd-stage SCI and data (e.g., data of a transport block and optionally other type of data). For example, the 1st-stage or 2nd-stage SCI can be generated and processed (e.g., channel coding, modulation, precoding, and the like) at a physical layer before being mapped to resource elements (REs) in the respective physical channels (e.g., PSCCH or PSSCH). The transport block can be received from a higher layer (e.g., medium access control (MAC) layer) and processed (e.g., channel coding, modulation, precoding, and the like) at the physical layer before being mapped to REs in the respective PSSCH.

II. Conflict Between Data Transmissions

Figure 3:
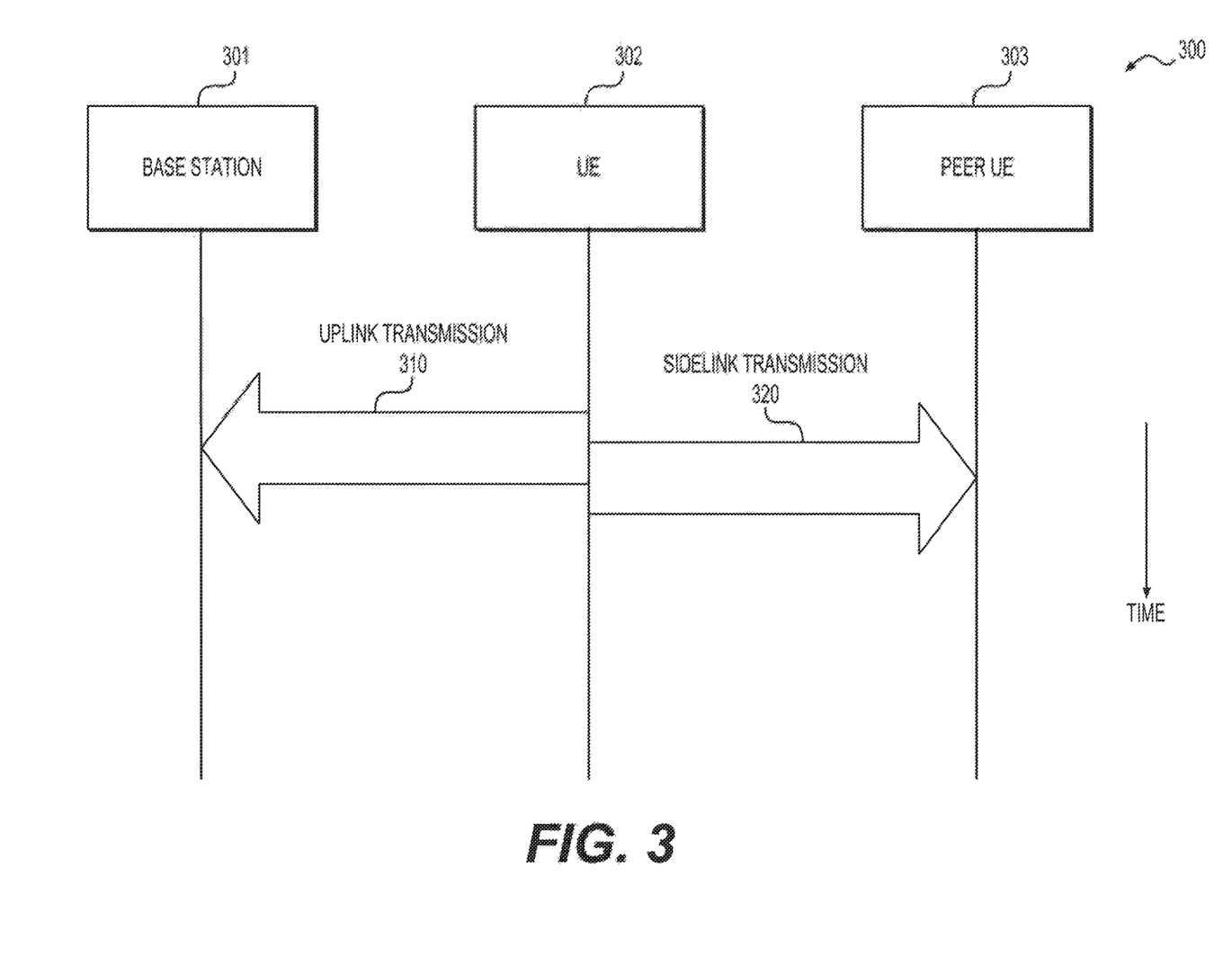
FIG. 3 shows an example 300 where an uplink (UL) transmission 310 and a SL transmission 320 have been scheduled, and overlap with each other in time domain.

FIG. 3 shows an example 300 where an UL transmission 310 and a SL transmission 320 have been scheduled, and overlap with each other in time domain. As shown, the UL transmission 310 is from a UE 302 to a BS 301, while the SL transmission 320 is from the UE 302 to a peer UE 303. Under certain scenarios, the UE 302 can be scheduled with the two transmissions 310-320 overlapping with each other in time domain; however, the UE 302 may not be capable of handling the two transmissions 310-320 simultaneously, which is determined by UE capability in some cases.

In an example, the UE 302 operates within the coverage of the BS 301. UL communications and SL communications of the UE 302 share a same carrier. The UE 302 can be configured with a first sequence of periodic grants for UL transmissions, and a second sequence of periodic grants for SL transmissions by the BS 301. The two sequences of configured grants may collide with each other at certain occasions. In another case, after a first radio resource has been allocated for a SL transmission (by either Mode 1 or Mode 2 resource allocation), the BS 301 may schedule a second radio resource overlapping the first radio resource for an urgent transmission (e.g., an urgent call). In a further case, the BS 301 may not support SL communications and is unaware of resource allocation by the UE 302. Accordingly, an UL resource scheduled by the BS 301 may overlap a SL resource allocated by the UE 302 itself. In the first scenario, the UE 302 may prioritize one of the two transmissions 310-320 and drop the other un-prioritized one to avoid a collision over a resource of the shared carrier.

In another example, the UE 302 operates UL communications and SL communications with different carriers. No resource overlapping in frequency domain takes place. However, the UE 302 may share a same transmission chain for both UL and SL transmissions. Accordingly, when two transmissions overlapping in time domain occur, the UE 302 is unable to perform the two overlapping transmissions.

In various examples, the UL transmission 310 can be transmissions of an UL MAC protocol data unit (PDU)

carried in a physical uplink shared channel (PUSCH), a signaling message carried in a physical uplink control channel (PUCCH), or the like. The SL transmission 320 can be transmissions of a SL MAC PDU carried in a PSSCH, SL HARQ feedback information carried in a PSFCH, broadcasting information carried in a PSBCH, or the like.

In addition, collision or conflict issues may happen in other scenarios, and the UE 302 can accordingly make a decision to prioritize one transmission over another one transmission. For example, for UL transmissions, a PUCCH transmission for a scheduling request (SR) may collide with a PUSCH transmission carrying a transport block. An UL or SL grant may have a limited capacity not enough for carrying a whole set of candidate elements (e.g., various MAC control elements (CEs), and MAC service data units (SDUs)). The UE 302 may determine which candidate elements are to be transmitted according to a rule or a preconfigured priority order.

III. Prioritization Between UL and SL Transmissions

Figure 4:
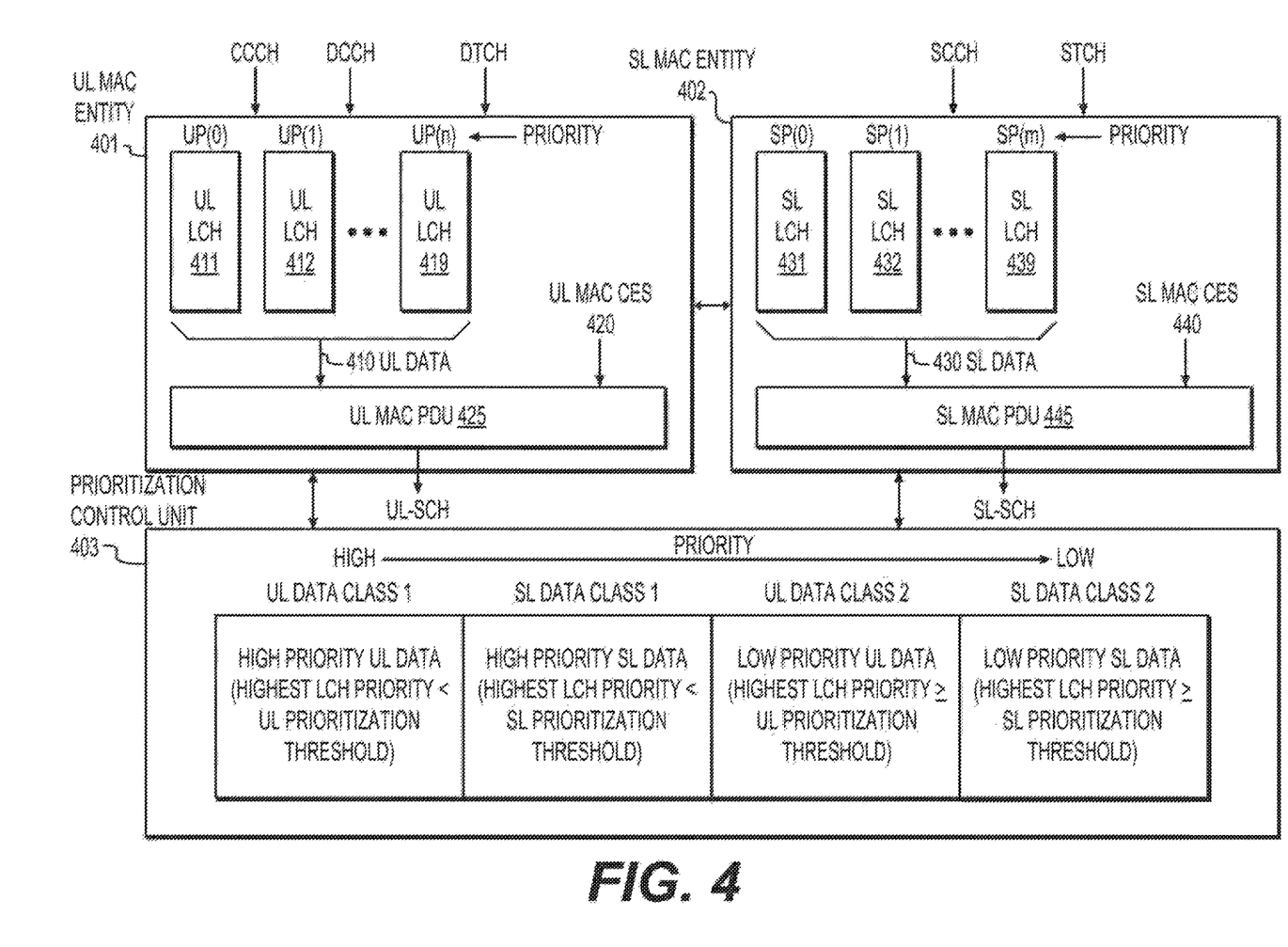
FIG. 4 shows an example of medium access control (MAC) layer operations at a user equipment (UE) for handling UL and SL transmissions overlapping in time domain.

FIG. 4 shows an example of MAC layer operations at a UE for handling UL and SL transmissions overlapping in time domain. As shown, an UL MAC entity 401 and a SL MAC entity 402 operate in a MAC layer of the UE 102 in the FIG. 1 example under the control of a prioritization control unit 403.

The UL MAC entity 401 handles UL transmissions over the Uu link 111. For example, multiple UL logical channels (LCHs) 411-419 can be established at the UL MAC entity 401 for receiving UL data from a radio link control (RLC) layer in unit of MAC SDU. Each UL LCH 411-419 can correspond to or represent a buffer storing the received UL data. In an example, the UL data received from the RLC layer can be received through different types of UL logical channels, such as a common control channel (CCCH), a dedicated control channel (DCCH), a data traffic channel (DTCH), or the like. The UL MAC entity 401 can provide different data transfer services on different types of UL control or traffic channels.

A priority can be configured by the BS 101 and associated with each UL LCH 411-419. The priorities corresponding to the UL LCHs 411-419 are denoted UP(0)-UP(n). Each priority can reflect certain quality of service (QoS) requirements of the UL data received at the respective UL LCH. In an example, the priorities UP(0)-UP(n) can have 16 different levels each corresponding to a priority value (e.g., 0, 1, 2, etc.). In the FIG. 4 example, a higher priority has a smaller priority value. In other example, a higher priority may be assign a larger priority value.

When an UL grant is received (e.g., dynamic grant) or is available (e.g., configured grant), the UE 102 can perform an UL logical channel prioritization (LCP) process to allocate granted resources for the UL LCHs 411-419. For example, the UL MAC entity 401 can multiplex UL data 410 from all or a subset of the UL LCHs 411-412 into a UL MAC PDU 425 according to the priorities of the UL LCHs 411-419 and some mapping restrictions. In addition, one or more MAC CEs 420 can also be generated and added to the UL MAC PDU 425. If UL transmission is prioritized, the UL MAC PDU 425 can be passed to a physical layer through a transport channel such as an UL shared channel (UL-SCH). The physical layer further processes the UL MAC PDU 425 (as a transport block) and transmits the processed transport block out of the UE 102.

The SL MAC entity 402 handles SL transmissions over the SL 120. Similarly, multiple SL LCHs 431-439 can be established at the SL MAC entity 402 for receiving SL data from the RLC layer in unit of MAC SDU. Each SL LCH 431-439 can correspond to or represent a buffer storing the received SL data. In an example, the SL data received from the RLC layer can be received through different types of SL logical channels, such as a SL control channel (SCCH), a SL traffic channel (DTCH), or the like. The SL MAC entity 402 can provide different data transfer services on different types of SL control or traffic channels.

Priorities, denoted SP(0)-SP(m) can be configured by the BS 101 and associated with each SL LCH 431-439. Each priority can reflect quality of service (QoS) requirements of the SL data received at the respective SL LCH. In an example, the priorities SP(0)-SP(n) can have 8 different levels each corresponding to a priority value (e.g., 0, 1, 2, etc.). In the FIG. 4 example, a higher priority of the SL LCHs 431-439 has a smaller priority value. In other example, a higher priority may be indicated by a larger priority value.

When a SL grant is received or is available, the UE 102 can perform a SL LCP process to allocate granted resources. For example, the SL MAC entity 402 can multiplex SL data 430 from all or a subset of the SL LCHs 431-432 into a SL MAC PDU 445 according to the priorities of the SL LCHs 411-419 and some mapping restrictions. In addition, one or more MAC CEs 440 can also be generated and added to the SL MAC PDU 445. If SL transmission is prioritized, the SL MAC PDU 445 can be passed to the physical layer through a transport channel such as a SL shared channel (SL-SCH). The physical layer further processes the SL MAC PDU 445 (as a transport block) and transmits the processed transport block out of the UE 102.

The prioritization control unit 403 can be configured to first determine if the above UL and SL grants overlap in time domain. If so, the prioritization control unit 403 can further determine one of the conflicting UL and SL transmissions corresponding to the two grants to be prioritized over the other one.

The prioritization decision in principle can be based on QoS requirements of data included in the UL data 410 and the SL data 410. Those QoS requirements can be configured by the BS 101 or determined by the UE 102 according to what applications the data is related with. For example, the 3GPP has defined three groups of applications: eMBB (enhanced Mobile Broadband), URLLC (Ultra Reliable Low Latency Communications), and mMTC (massive Machine Type Communications). Different QoS characteristics can be defined for different types of applications, and indicated by different QoS parameters.

In an embodiment, the prioritization control unit 403 can make prioritization decisions using the UL priorities (e.g., UP(0)-UP(n)) associated with the UL LCHs 411-419 and the SL priorities (e.g., SP(0)-SP(9)) associated with the SL LCHs 431-439. As an example, the prioritization decision can be made in the following way.

First, two thresholds, an UL prioritization threshold and a SL prioritization threshold, can be configured by the BS 101 to the UE 102. The UL prioritization threshold can have a value in a range of possible priority values of UL LCHs at the UL MAC entity 401. The SL prioritization threshold can have a value in a range of possible priority values of SL LCHs at the SL MAC entity 402.

Then, a highest UL priority of the UL LCHs having data included (or to be included) in the UL data 410 can be identified, and a highest SL priority of the SL LCHs having data included (or to be included) in the SL data 430 can be identified. Thereafter, by comparing the identified UL and SL priorities with the UL and SL prioritization thresholds, respectively, the UL data 410 and the SL data 430 can be classified into one of 4 classes: UL data class 1, SL data class 1, UL data class 2, and SL data class 2. As shown in FIG. 4, the 4 classes from left to right are arranged in an order from the highest priority to the lowest priority.

Specifically, the UL data 410 can be classified as high priority UL data (UL data class 1) if the highest UL priority of the UL LCHs having data included (or to be included) in the UL data 410 has a priority value lower than the UL prioritization threshold. Otherwise, the UL data 410 is classified as low priority UL data (UL data class 2). The SL data 430 can be classified as high priority SL data (SL data class 1) if the highest SL priority of the SL LCHs having data included (or to be included) in the SL data 430 has a value lower than the SL prioritization threshold. Otherwise, the SL data 430 is classified as low priority SL data (SL data class 2). Based on the priorities of the 4 classes, which of the UL data 410 and the SL data 430 has a higher priority can be determined. Accordingly, the UL or SL transmission corresponding to the UL or SL data with a higher priority can be prioritized and transmitted.

In other embodiments, in order to compare an UL LCH priority with a SL LCH priority for the purpose of prioritization between UL and SL transmission, priority values of the UL LCHs 411-419 or the SL LCHs 421-439 can be mapped to a unified dimension. The mapping relationship can be (pre-)configured to the UE 102. In an example, UL priority values are mapped to equivalent values of SL priority values. In another example, SL priority values are mapped to equivalent values of UL priority values. In a further example, both the priority values of the UL and SL LCHs can be mapped to comparable values for UL and SL LCH priority comparison. Table 1 shows such an example.

TABLE 1

| UL LCH Priority | Priority for UL/SL comparison | SL LCH priority | Priority for UL/SL comparison |
|---|---|---|---|
| 1 | 3.5 | 1 | 1.5 |
| 2 | 4.5 | 2 | 5 |
| ... | ... | ... | ... |
| 16 | 100 | | |

IV. SCCH Data Prioritization

The data received from the SCCH at the SL MAC entity 402 in the FIG. 4 example can include control signaling/messages to be exchanged with a peer UE (e.g., UE 103) of the UE 102 over a PC5 interface. The control signaling/messages may be a PC5-RRC message or a PC5-S message, and can include access stratum (AS) configuration, security information, measurement report related configuration, UE capability related signaling (e.g. enquiry and response), PC5-RRC connection management related messages (e.g. signaling exchange for RRC reconfiguration for sidelink), or the like.

In an embodiment, the SCCH data is configured to have a higher priority than SL traffic data (e.g., data from the STCH in FIG. 4). For example, during a SL LCP process, control data from the SCCH is prioritized over the traffic data from the STCH for being multiplexed into a SL grant. In an example, the SL LCHs 431-439 are prioritized according to the following order (highest priority listed first):
   data from SCCH;
   SL channel state information (CSI) MAC CE;
   data from STCH.

In an embodiment, control data from SCCH channel is configured with a SL LCH priority that can be used for comparison with SL LCH priorities of traffic data from STCH. For example, the SL LCH priority of the control data can be configured by the BS 101 in FIG. 1, preconfigured to the UE 102, or determined by the UE 102. In an example, during a SL LCP process, the UE 102 can compare the SL LCH priorities of the control data and the traffic data to determine a destination UE. In an example, during a SL LCP process, the UE 102 can compare the SL LCH priorities of the control data and the traffic data to allocate resources in a grant for a selected destination UE.

In addition, the SL LCH priority configured for the control data of SCCH can be used for comparison with a priority of an UL transmission (e.g., a PUSCH, or a PUCCH) for UL/SL prioritization using various methods described herein. The UL transmission may include logical channel control data, traffic data, or MAC CEs.

Moreover, in sidelink communication, each SL QoS flow from the upper layer can be mapped to a sidelink radio bearer (SLRB) in AS layer, and each SLRB is associated with a distinct SL logical channel. SLRBs can be classified into sidelink signaling radio bearers (SL-SRBs) and sidelink data radio bearers (SL-DRBs). SL-SRBs can be used to carry control signaling such as PC5-S message, PC5-RRC message, discovery message, or other control signaling transmitted over PC5 interface. Different SL-SRBs may be used to carry different kinds of control signaling. In contrast, SL-DRBs can be used to carry user data (e.g., data from the upper layer). Since control signaling carried by a SL-SRB is more essential than data carried by a SL-DRB, in some embodiments, SL-SRB traffic is prioritized over SL-DRB traffic. In an embodiment, each SL-SRB is associated with a SL logical channel with a high SL LCH priority (e.g. a higher priority than the associated SL LCH priority of certain SL-DRBs). In an embodiment, SL-SRBs can be carried by a SCCH to ensure a high priority during the multiplexing process.

V. Prioritization Between UL BSR and SL BSR for Multiplexing

An UL buffer status report (BSR) can be triggered at the UE 102 to provide the serving BS (e.g., the BS 101) with information about UL data volume in the UL MAC entity 401. For example, when UL data becomes available at the UL MAC entity 401 in FIG. 4, if this UL data belongs to a LCH having a highest priority among LCHs having data available for transmission, or no LCHs 411-419 contains available UL data, an UL BSR can be triggered. In some examples, the LCHs 411-419 are organized into logical channel groups (LCGs). Buffer status (data volumes) of each LCG with data are included in the UL BSR. In an embodiment, the UL BSR can be included in a MAC CE (e.g., one of the UL MAC CEs 420). The MAC CE can be prepended with a MAC subheader to form a sub MAC PDU. The sub MAC PDU is included into an UL MAC PDU (e.g., the UL MAC PDU 425).

Similarly, a SL BSR can be triggered at the UE 102 when SL data becomes available at the SL MAC entity 401. Buffer status of SL LCGs (if configured) having data can be included in the SL BSR. A SL BSR MAC CE (e.g., one of the UL MAC CEs 420) can be formed and included in the UL MAC PDU that may also carry the UL BSR MAC CE.

When both an UL BSR and a SL BSR are pending, and UL-SCH resources are available but not enough to accommodate both the UL BSR and SL BSR, the UE 102 can make a prioritization decision for transmitting the UL BSR and the SL BSR. It is noted that, in some embodiment, the mentioned prioritization decision below may only be applied to regular/periodic UL BSR and regular/periodic SL BSR, i.e., not apply to padding UL BSR and padding SL BSR.

In an embodiment, the UE 102 sorts to-be-transmitted UL and SL data according to the respective UL and SL LCH priorities, and includes buffer status of the UL and SL data according to the order of the sorted UL and SL data. For example, buffer status of UL or SL data with a higher LCH priority has a higher priority to be reported than that of UL or SL data with a lower LCH priority. Buffer status of UL or SL data with highest LCH priorities can be prioritized to be included in an UL MAC PDU.

In an example, the data corresponding one or more LCHs with highest LCH priorities is UL data. Accordingly, an UL BSR MAC CE can be formed to include buffer status of that part of UL data, and put into the UL MAC PDU. In an example, the data corresponding one or more LCHs with highest LCH priorities is SL data. Accordingly, a SL BSR MAC CE can be formed to include buffer status of that part of SL data, and put into the UL MAC PDU. In an example, the data corresponding one or more LCHs with highest LCH priorities includes UL data and SL data. Accordingly, an UL BSR MAC CE and a SL BSR MAC CE can be formed to include buffer status of the respective UL data and the SL data, respectively, and put into the UL MAC PDU.

In the above example, the UL or SL BSR MAC CE may include the buffer status of a subset of all UL or SL LCHs. For example, buffer status of UL or SL data other than the UL or SL data with the highest LCH priorities are not included in the UL MAC PDU. The BSR in such a scenario is referred to as a truncated BSR.

In an embodiment, to sort the UL and SL data, the LCH priorities of the UL and SL data are not compared directly. Instead, the LCH priorities of the UL and SL data are mapped to a same dimension (comparable values) before being compared. Or, the LCH priorities of the UL data are mapped to equivalent SL LCH priority values before being compared.

In an embodiment, the sorting of the UL and SL data is based on the UL prioritization threshold and the SL prioritization threshold used in the FIG. 4 example. For example, UL data having LCH priorities smaller than the UL prioritization threshold can be classified as prioritized UL data. UL data having LCH priorities larger than the UL prioritization threshold can be classified as non-prioritized UL data. Similarly, by comparing with the SL prioritization threshold, SL data can be classified into prioritized SL data and non-prioritized SL data. Accordingly, the UL and SL data can be sorted in the following order (highest priority listed first): prioritized UL data, prioritized SL data, non-prioritized UL data, and non-prioritized SL data. UL-SCH resources can be allocated according to the priority order of the sorted UL and SL data for transmitting buffer status of the sorted UL and SL data until available resources are exhausted.

In some examples, LCG-based BSR is employed. In an example, to sort the UL and SL data, LCGs with available data can be sorted according to a highest LCH priority of LCHs belonging to the respective LCG. For example, the sorting of the LCGs can be based on direct comparison of the highest LCH priorities of different LCGs, or can be performed by mapping the highest LCH priorities of each LCG to comparable values.

In an example, the sorting of the LCGs can be based on the UL prioritization threshold and the SL prioritization threshold used in the FIG. 4 example, and UL and SL LCGs are classified into four ordered classes (highest priority listed first): prioritized UL LCGs, prioritized SL LCGs, non-prioritized UL LCGs, and non-prioritized SL LCGs. In an example, buffer status of prioritized UL LCGs are included in an UL BSR MAC CE that is included in the UL MAC PDU. In an example, buffer status of prioritized UL LCGs and prioritized SL LCGs are included in an UL BSR MAC CE and a SL BSR MAC CE, respectively, that are included in the UL MAC PDU.

In an example, prioritized UL LCGs does not exist (e.g., highest LCH priorities of each UL LCHs are larger than the UL prioritization threshold). Accordingly, buffer status of prioritized SL LCGs are prioritized and included in an SL BSR MAC CE for transmission. In an embodiment, if the remaining UL grant size after including buffer status of prioritized SL LCGs can accommodate the whole UL BSR MAC CE, then UL BSR MAC CE is included in the UL MAC PDU as well. Otherwise, there are two approaches: in one method, the UL BSR MAC CE is then not included in the UL MAC PDU, and the remaining bytes of this UL grant is used to accommodate buffer status of more non-prioritized SL LCGs; in another method, buffer status of non-prioritized UL LCGs of the UL BSR MAC CE are included into this MAC PDU as much as possible, i.e. allow the MAC PDU to include a non-padding but truncated UL BSR MAC CE.

VI. Elements to Identify a HARQ Process

In the FIG. 4 example, for SL transmission at the SL MAC entity 402, SL data in each SL LCH 431-439 (or each LCG) may be associate with a destination layer-2 identifier (ID) for identifying a destination (a peer UE). The destination layer-2 ID may optionally be associated with a cast mode (cast type), such as a unicast mode, a groupcast mode, or a broadcast mode. By comparing the LCH priorities of the SL LCHs 431-439, the destination of the LCH having the highest LCH priority can be determined, and used for a next SL MAC PDU transmission. Accordingly, the LCHs with the same destination (the same layer-2) ID as the determined destination can be considered for a LCP process, and the corresponding SL data can be multiplexed into the next SL MAC PDU.

The newly formed SL MAC PDU can subsequently be transmitted by a HARQ entity of the SL MAC entity 402. For example, a HARQ process of the HARQ entity can be selected for handling the transmission of the SL MAC PDU. The selected HARQ process can have a HARQ process ID for identifying the selected HARQ process.

The HARQ process ID, a source layer-2 ID of the UE 102, the destination layer-2 ID, and the corresponding cast mode (e.g., a cast mode indication) can be transmitted together with the newly formed SL MAC PDU. In an example, when receiving the SL MAC PDU, a peer UE can identify which HARQ process is being used based on the HARQ process ID, the source layer-2 ID of the UE 102, and the destination layer-2 ID. In an example, when receiving the SL MAC PDU, a peer UE can identify which HARQ process is being used based on the HARQ process ID, the source layer-2 ID of the UE 102, the destination layer-2 ID, and the cast mode. In addition, in an example, based on the cast mode information, the peer UE can determine whether or how to respond with a HARQ feedback depending on the cast mode.

In an example, the newly formed SL MAC PDU is passed to the physical layer, and transmitted in a PSSCH. The HARQ process ID, the source layer-2 ID of the UE 102, the destination layer-2 ID, and the corresponding cast mode are passed to the physical layer, and transmitted as part of sidelink control information (SCI) associated with the PSSCH.

VII. Consider URLLC Traffic in UL and SL Prioritization

In an embodiment, when an UL-related transmission and a SL-related transmission overlaps in time domain, the UE 102 makes a decision to prioritize between these two transmissions. For example, the UL-related transmission can be a PUCCH transmission of an SR triggered by UL data, or a PUSCH transmission of UL data. The SL-related transmission can be a PUCCH transmission for SL HARQ feedback information of SL data. Or, the SL-related transmission can be a SL synchronization signal block (SSB) including primary and secondary synchronization signals and a physical SL broadcast channel (PSBCH). The SL SSB is associated with a specific SL logical channel priority for SL transmission, for example, by (pre)configuration. Or, the SL-related transmission can be a PSFCH related with SL data. Or, the SL-related transmission can be a PSSCH transmission for a SL MAC PDU carrying SL data.

To prioritize the UL-related transmission and the SL-related transmission, the UL data and the SL data (associated with the UL-related transmission and the SI-related transmission, respectively) can each be classified into one of the following ordered classes (class with a highest priority listed first): UL data class A, SL data class A, UL data class B, SL data class B, . . . , UL data class N, and SL data class N. The classification can be based on the traffic characteristics or QoS requirements of the UL data and the SL data. After the classification, a priority of the UL data can be determined to be the priority of the data class the UL data belongs to, and a priority of the SL data can be determined to be the priority of the data class the SL data belongs to. Accordingly, a priority of the UL-related transmission can be determined based on the priority of the UL data, and a priority of the SL-related transmission can be determine based on the priority of the SL data. Based on the priorities of the UL-related and SL-related transmissions, the prioritization can be determined.

In an embodiment, when the UL data is URLLC traffic, the UL data is classified into the UL class having the highest priority. When the UL data is non-URLLC traffic, the UL data is not classified into the UL class having the highest priority. When the SL data is URLLC traffic, the SL data is classified into the SL class having the highest priority. When the SL data is non-URLLC traffic, the SL data is not classified into the SL class having the highest priority.

In an embodiment, the UL-related transmission is for the UL data belonging to URLLC traffic, and the SL-related transmission is one of a PSFCH transmission, a SL-SSB transmission, or a PUCCH transmission for SL HARQ feedback information that is related with the SL data that can belong to URLLC traffic or non-URLLC traffic. Under such a scenario, a priority threshold, referred to as a SL URLLC threshold, is (pre-)configured to the UE 102. When the SL data belongs to URLLC traffic, by comparing a priority of the SL data (e.g., a highest LCH priority of the SL data) with the SL URLLC threshold, the SL data can be categorized into one of the following two classes: high priority SL URLLC data having a LCH priority value lower than the SL URLLC threshold, and low priority SL URLLC data having a LCH priority value higher than the SL URLLC threshold. The former class can have a higher priority than the latter class.

Accordingly, the prioritization of the UL-related transmission and the SL-related transmission can be performed according to the following ordered classes (class with highest priority listed first): high priority SL URLLC data, UL URLLC data, and low priority SL URLLC data, and non-URLLC SL data. For example, the UL data and SL data can each be classified into one of the above 4 classes to determine respective priorities of the UL data and SL data. Accordingly, priorities of the UL-related transmission and the SL-related transmission can be determined based on the priorities of the UL data and SL data. Prioritization can then be determined based the priorities of the UL-related transmission and the SL-related transmission.

In an embodiment, the UL-related transmission is for the UL data belonging to non-URLLC traffic, and the SL-related transmission is one of a PSFCH transmission, a SL-SSB transmission, or a PUCCH transmission for SL HARQ feedback information that is related with the SL data that can belong to URLLC traffic or non-URLLC traffic. In such a scenario, the SL data can be classified into SL high priority data class or SL low priority data class by comparing a highest LCH priority of the SL data with the SL prioritization threshold in the FIG. 4 example. When the SL data belongs to the SL high priority data class, the SL-related transmission is prioritized over the UL-related transmission. When the SL data belongs to the SL low priority data class, the UL-related transmission is prioritized over the SL-related transmission.

VIII. Priority of UL MAC CEs for UL/SL Prioritization

In an embodiment, in prioritization between an UL transmission and a SL transmission overlapping with each other in time domain, the UL transmission can be prioritized if a MAC PDU of the UL transmission includes a certain type of UL MAC CE which has a higher priority than UL data (e.g., from a logical traffic channel) except for uplink data from UL-CCCH (common control channel). For example, the certain type of UL MAC CE can be one of:

a UL BSR MAC CE,
a SL BSR MAC CE,
a power headroom report (PHR) MAC CE,
a common control channel (CCCH) service data unit (SDU),
a radio resource control (RRC) message,
a signaling radio bearer (SRB) message,
a C-RNTI MAC CE,
a third message (Msg3) of a random access process,
a first message (MsgA) of a 2-step random access procedure,
a beam failure recovery request for a secondary cell (BFRQ) MAC CE, or
a configured grant confirmation MAC CE.
a sidelink configured grant confirmation MAC CE IX. Mapping from a SL LCH Priority to a Priority Indicated in an SCI In some embodiments, an SCI associated with a PSSCH can include a priority indication field in a 1st-stage SCI of the SCI. The priority indication field can indicate a priority of a transport block (TB) carried in the PSSCH. When an initial transmission including the 1st-stage SCI is transmitted from the UE 102 over resources in a resource pool, a peer UE operating in resource allocation Mode 2 can obtain the priority information in the initial transmission after performing a sensing process. The peer UE can accordingly determine if the peer UE can use a resource reserved for retransmission of the initial transmission for transmitting a TB of the peer UE by comparing a priority of its own TB with the priority of the initial transmission of the UE 102.

In the FIG. 4 example, for transmission of the SL MAC PDU 445, a highest SL LCH priority of the LCHs having data available for transmission or a highest LCH priority of SL MAC CE multiplexed in the SL MAC PDU 445 can be mapped to a priority indication in an SCI associated with the SL MAC PDU 445.

In an embodiment, a range of the priorities of the SL LCHs 431-439 can be the same as a range of the priority indications in SCI. For example, both the SL LCH priorities and the SCI priority indications have 8 priority levels. Accordingly, a SL LCH priority can be mapped to a SCI priority indication in a one-to-one manner.

In another embodiment, the range of the SL LCHs can be different from the range of the SCI priority indications. For example, possible priority values of the SL LCHs 431-439 can have 16 levels, while possible values of the SCI priority indication can have 8 levels. Under such a configuration, a mapping relationship between the SL LCH priorities and the SCI priority indications can be configured by the BS 101, or can be preconfigured to the UE 102 (e.g., stored in the UE 102).

X. Priority of SL BSR MAC CE

In an embodiment, when an UL BSR and a SL BSR are pending, and an UL grant cannot accommodate both the UL BSR and the SL BSR, the UE 102 can perform prioritization between the UL BSR and the SL BSR based on a first priority of UL data triggering the UL BSR and a second priority of SL data triggering the SL BSR. The first priority of the UL data can be the priority of one of the UL LCHs 411-412 storing the UL data triggering the UL BSR, while the second priority of the SL data can be the priority of one of the SL LCHs 431-439 storing the SL data triggering the SL BSR.

Based on the UL prioritization threshold and the SL prioritization threshold shown in FIG. 4, considering the first priority of the UL data and the second priority of the SL data, the UL data and SL data can each be classified into one of the four classes shown in FIG. 4. Based on the priority order of the four classes, it can be determined which of the UL and SL data has a higher priority. Thus, priority between the UL BSR and the SL BSR can be determined based on which of the UL and SL data has the higher priority.

In an embodiment, the UE 102 can allocate resources of the UL-SCH to the UL data 410 and the UL MAC CEs 420 according to the following order (highest priority listed first):

data from UL CCCH;
 MAC CE for SL BSR when the SL BSR is prioritized over the UL BSR as described above (Section X);
 MAC CE for UL BSR;
 power headroom report (PHR) MAC CE;
 MAC CE for SL BSR when the UL BSR is prioritized over the SL BSR as described above (Section X).
 data from the LCHs 411-419.

XL Trigger Condition of SL SR Due to Latency Consideration

In an embodiment, an SR can be triggered at the MAC layer of the UE 102 for requesting UL resources for transmission of a SL BSR under certain conditions. For example, in the FIG. 4 example, a SL BSR can be triggered at the SL MAC entity 402 when new SL data becomes available at the SL LCH 431. An UL MAC CE (e.g., one of the UL MAC CEs 420) can be formed to carry the SL BSR, and included in the UL MAC PDU 425 transmitted using the available UL-SCH resources.

However, if a latency QoS requirement is associated with the SL LCH 431, and the latency of the available UL-SCH resources cannot satisfy the latency QoS requirement, the MAC layer of the UE 102 can decide to trigger an SR (referred to as a SL SR). The SL SR can be used to request UL resources from the BS 101 for transmitting the SL BSR triggered by the SL data arriving at the SL LCH 431.

For example, a maximum PUSCH duration can be configured to the SL LCH 431 as part of the latency QoS requirement. The UL-SCH resources can have an associated PUSCH duration corresponding to the start and end timing of a PUSCH transmission. If the PUSCH duration of the UL-SCH resources is larger than the maximum PUSCH duration configured to the SL LCH 431, the SL SR can be triggered.

For example, the SL SR can be carried in a PUCCH. The PUCCH is transmitted using one of a sequence of previously configured periodic UL grants. In response to the SL SR, the BS 101 can schedule an UL grant to the UE 102. When the UL grant is received, the UE 102 can transmit the SL BSR triggered by the SL data of the SL LCH 431. In response to the SL BSR, the BS 101 can schedule a SL grant to the UE 102 for transmission of SL data at the SL MAC entity 401 over the SL 120.

XII. Priority of SR for Prioritization Between Transmissions

In some embodiments, a priority of an SR (e.g., an UL SR or a SL SR) can be determined to be a priority of a LCH that triggers the SR when performing prioritization between two transmissions overlapping with each other in time domain. For example, in FIG. 4, if an UL SR is triggered for transmitting an UL BSR triggered by UL data of the UL LCH 411, a priority of the UL SR can be the same as the UL LCH priority of the UL LCH 411. If a SL SR is triggered for transmitting a SL BSR triggered by SL data of the SL LCH 431, a priority of the SL SR can be the same as the SL LCH priority of the SL LCH 431.

In an example, an UL transmission of an UL SR overlaps a SL transmission of SL data. For example, UL-SCH resources for transmitting the UL SR overlaps SL-SCH resources for transmitting the SL data in time domain. The UE 102 can prioritize between the UL SR and the SL data based on the classification method shown on FIG. 4. For example, by comparing a priority of the UL SR (that is the priority of the UL LCH triggering the UL SR) with the SL prioritization threshold, the UL SR can be classified into the UL data class 1 or 2. By comparing a highest LCH priority of SL LCHs having data included in the SL data, the SL data can be classified into the UL data class 1 or 2. Then, based on the ordered priorities of the four classes, a prioritization decision of which of the UL SR and the SL data is to be prioritized can be made.

In another example, an UL transmission of a SL SR overlaps a SL transmission of SL data. Similarly, using the classification method in FIG. 4, and based on a priority of the SL SR (that is a LCH priority of a SL LCH triggering the SL SR) and a priority of the SL data (that is a highest LCH priority of SL LCHs having data in the SL data), a prioritization between the SL SR and the SL data can be determined.

In a further example, an UL transmission of a SL SR and an UL transmission of UL data overlap with each other. Similarly, using the classification method in FIG. 4, and based on a priority of the SL SR (that is a LCH priority of a SL LCH triggering the SL SR) and a priority of the UL data (that is a highest LCH priority of UL LCHs having data in the UL data), a prioritization between the SL SR and the UL data can be determined.

XIII. Processes of Prioritization Between Overlapping Transmissions

Figure 5:
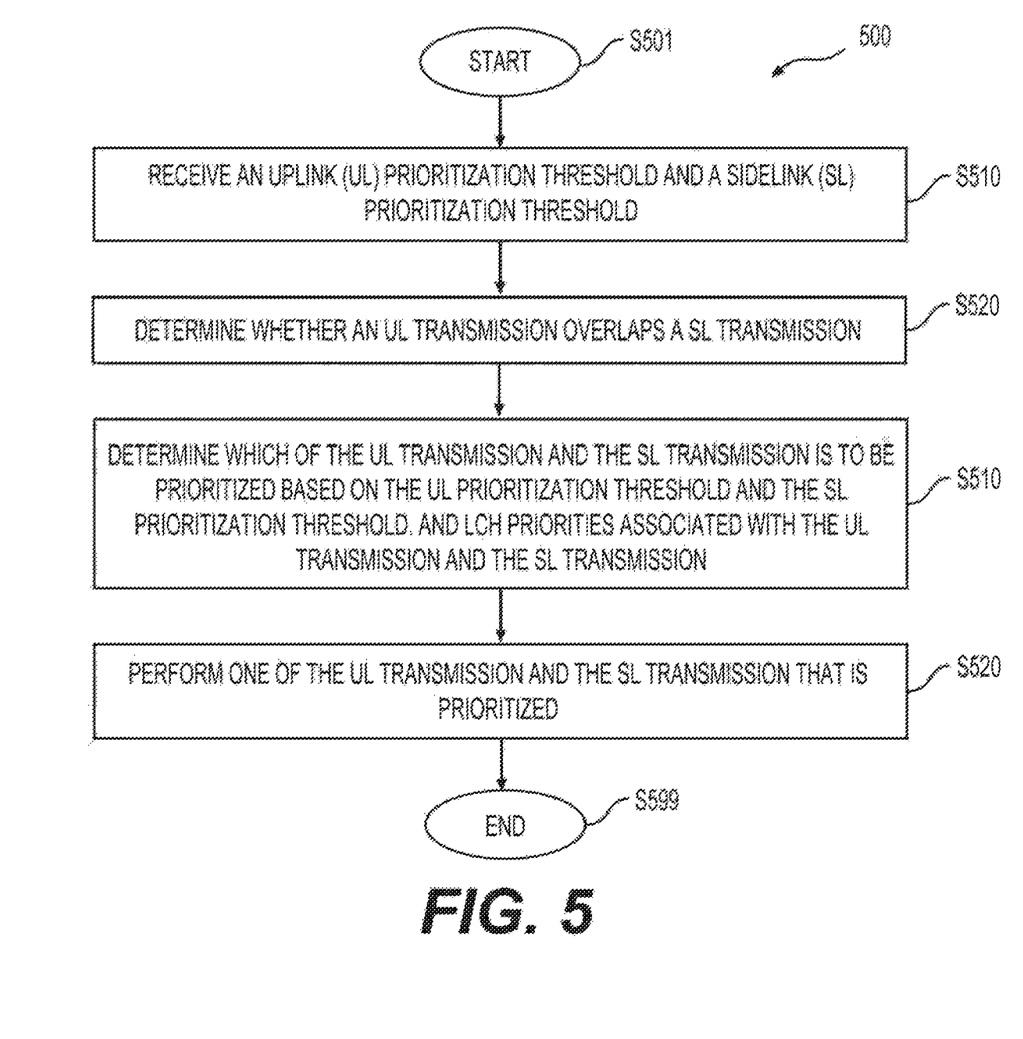
FIG. 5 shows a process 500 of prioritization between an UL transmission and a SL transmission that overlap with each other in time domain.

FIG. 5 shows a process 500 of prioritization between an UL transmission and a SL transmission that overlap with each other in time domain. The process 500 can be performed at the UE 102 in FIG. 1 when the UE 102 cannot perform the UL transmission and the SL transmission at the same time. The process 500 can start from S501, and proceed to S510.

At S510, an UL prioritization threshold and a SL prioritization threshold can be received at a MAC layer at a UE. The UL prioritization threshold and the SL prioritization threshold can be configured from a BS to the UE, for example, by RRC signaling, or can be preconfigured to the UE, for example, by storage in a UICC at the UE.

At S520, whether an UL transmission overlaps a SL transmission in time domain can be determined. For example, the UL transmission can be performed over an UL-SCH resource, while the SL transmission can be performed over a SL-SCH resource. In a first example, the UL-SCH resource and the SL-SCH resource can belong to a same UL component carrier and overlap with each other in time domain. In second example, the UL-SCH resource and the SL-SCH resource can belong to different carriers and overlap with each other in time domain. The UE is unable to handle the overlapping UL and SL transmissions at the same time due to limited capability (e.g., a same Tx chain being shared between UL and SL transmissions).

At S530, when it is determined than the UL transmission overlaps the SL transmission in time domain, which of the UL transmission and the SL transmission is to be prioritized can be determined. The prioritization can be performed based on the UL prioritization threshold and the SL prioritization threshold received at S510, and LCH priorities associated with the UL and SL transmissions. Various methods described herein can be employed for performing the prioritization.

For example, when a highest priority of an UL LCH(s) with UL data available for the UL transmission is lower than a priority corresponding to the UL prioritization threshold, and a highest priority of a SL LCH(s) with SL data available for the SL transmission is higher than a priority corresponding to the SL prioritization threshold, the SL transmission can be prioritized over the UL transmission.

When the highest priority of the UL LCH(s) with the UL data available for the UL transmission is higher than the priority corresponding to the UL prioritization threshold, or the highest priority of the SL LCH(s) with the SL data available for the SL transmission is lower than the priority corresponding to the SL prioritization threshold, the UL transmission can be prioritized over the SL transmission.

At S540, based on the prioritization decision at S530, one of the UL transmission and the SL transmission that is prioritized can be performed. The other one of the UL transmission and the SL transmission that is not prioritized is not performed. For example, the non-prioritized transmission may be postponed when a next resource is available, or the data of the non-prioritized transmission may be dropped. The process 500 can proceed to S599, and terminates at S599. It is noted that, in some embodiments, if the UE is capable of transmitting the overlapped UL transmission, the non-prioritized transmission may be transmitted with a smaller power compared to the prioritized transmission to satisfy the limit of the maximum transmission power.

XIV. Apparatus

Figure 6:
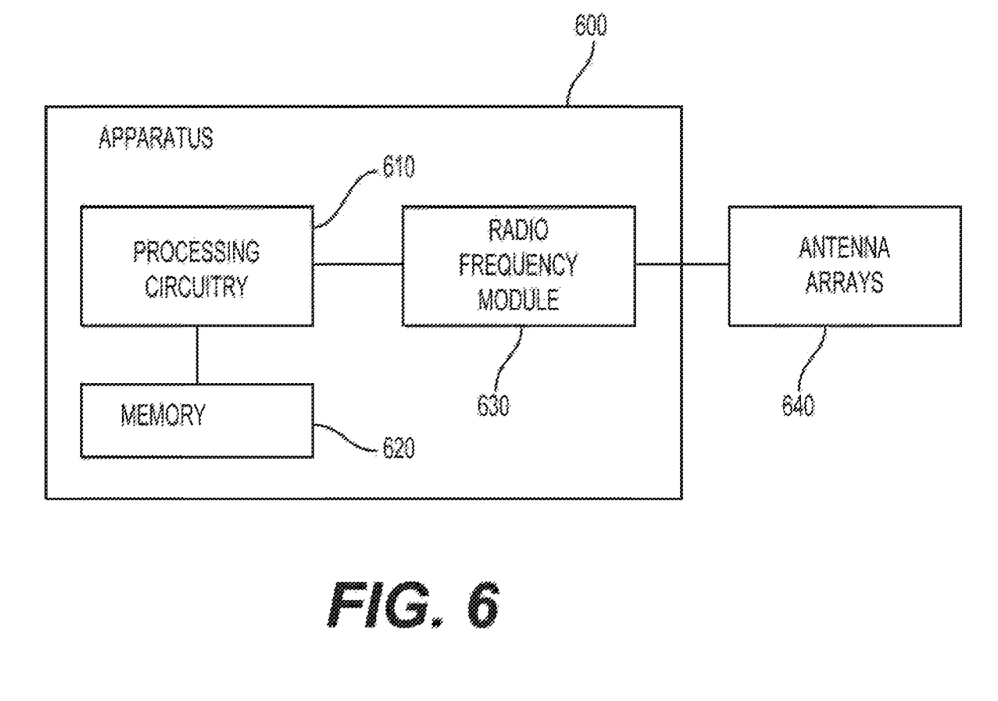
FIG. 6 shows an exemplary apparatus 600 according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of mechanisms, techniques, processes, functions, components, systems described herein. For example, the apparatus 600 can be used to implement functions of UEs or BSs in various embodiments and examples described herein. The apparatus 600 can include a general purpose processor or specially designed circuits to implement various functions, components, or processes described herein in various embodiments. The apparatus 600 can include processing circuitry 610, a memory 620, and a radio frequency (RF) module 630.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include non-transitory storage media, such as a read only memory (ROM), a random access memory (RAM), a flash memory, a solid state memory, a hard disk drive, an optical disk drive, and the like.

In an embodiment, the RF module 630 receives a processed data signal from the processing circuitry 610 and converts the data signal to beamforming wireless signals that are then transmitted via antenna arrays 640, or vice versa. The RF module 630 can include a digital to analog converter (DAC), an analog to digital converter (ADC), a frequency up converter, a frequency down converter, filters and amplifiers for reception and transmission operations. The RF module 630 can include multi-antenna circuitry for beamforming operations. For example, the multi-antenna circuitry can include an UL spatial filter circuit, and a DL spatial filter circuit for shifting analog signal phases or scaling analog signal amplitudes. The antenna arrays 640 can include one or more antenna arrays.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
    receiving an uplink (UL) prioritization threshold and a sidelink (SL) prioritization threshold at a user equipment (UE);
    determining whether an UL transmission overlaps a SL transmission in time domain;
    when the UL transmission overlaps the SL transmission in time domain, determining which of the UL transmission and the SL transmission is to be prioritized according to:
        when a highest priority of an UL logical channel(s) (LCH(s)) with UL data available for the UL transmission is lower than a priority corresponding to the UL prioritization threshold, and a highest priority of a SL LCH(s) with SL data available for the SL transmission is higher than a priority corresponding to the SL prioritization threshold, prioritizing the SL transmission over the UL transmission,
        when the highest priority of the UL LCH(s) with the UL data available for the UL transmission is higher than the priority corresponding to the UL prioritization threshold, prioritizing the UL transmission over the SL transmission, and
        when the highest priority of the SL LCH(s) with the SL data available for the SL transmission is lower than the priority corresponding to the SL prioritization threshold, prioritizing the UL transmission over the SL transmission; and
    performing one of the UL transmission and the SL transmission that is prioritized.

2. The method of claim 1, wherein the determining which of the UL transmission and the SL transmission is to be prioritized includes:
    when the highest priority of the UL LCH(s) with the UL data available for the UL transmission is higher than the priority corresponding to the UL prioritization threshold, classifying the UL data available for the UL transmission into UL data class 1;
    when the highest priority of the UL LCH(s) with the UL data available for the UL transmission is lower than the priority corresponding to the UL prioritization threshold, classifying the UL data available for the UL transmission into UL data class 2;
    When the highest priority of the SL LCH(s) with the SL data available for the SL transmission is higher than the priority corresponding to the SL prioritization threshold, classifying the SL data available for the SL transmission into SL data class 1;
    When the highest priority of the SL LCH(s) with the SL data available for the SL transmission is lower than the priority corresponding to the SL prioritization threshold, classifying the SL data available for the SL transmission into SL data class 2; and
    determining which of the UL transmission and the SL transmission is to be prioritized according to priorities of the UL data and the SL data that are determined based on the following priority order where the highest priority is listed first:
        data belonging to UL data class 1,
        data belonging to SL data class 1,
        data belonging to UL data class 2, and
        data belonging to SL data class 2.

3. The method of claim 1, wherein priorities of the UL LCHs with the UL data available for the UL transmission are represented by values with a lower value corresponding to a higher priority, and priorities of the SL LCHs with the SL data available for the SL transmission are represented by values with a lower value corresponding to a higher priority.

4. The method of claim 1, wherein the determining which of the UL transmission and the SL transmission is to be prioritized includes:
    when a value of the highest priority of the UL LCH(s) with the data available for the UL transmission is higher than the UL prioritization threshold, and a value of the highest priority of the SL LCHs with the data available for the SL transmission is lower than the SL prioritization threshold, prioritizing the SL transmission over the UL transmission; and
    when the value of the highest priority of the UL LCHs with the data available for the UL transmission is lower than the UL prioritization threshold, or the value of the highest priority of the SL LCHs with the data available for the SL transmission is higher than the SL prioritization threshold, prioritizing the UL transmission over the SL transmission.

5. The method of claim 1, wherein data from a SL control channel (SCCH) is prioritized over data from a SL traffic channel (STCH) for allocation of sidelink resources among the SL LCH(s).

6. The method of claim 1, further comprising:
    when both an UL buffer status report (BSR) and a SL BSR are triggered, classifying a SL logical channel group (LCG) as a prioritized SL LCG when a highest priority of one or more LCHs that belong to the SL LCG and have data available for transmission is higher than the priority corresponding to the SL prioritization threshold; and
    when a highest priority of one or more LCHs that belong to one or more UL LCGs having buffer status to be reported and have data available for transmission is lower than the priority corresponding to the UL prioritization threshold, prioritizing buffer status reporting of the prioritized SL LCG over buffer status reporting of the one or more UL LCGs.

7. The method of claim 1, wherein the prioritizing includes:
    including a SL-BSR medium access control (MAC) control element (CE) containing buffer status of the prioritized SL LCG in an UL MAC PDU; and
    including an UL-BSR MAC CE containing all or a subset of buffer status of the one or more UL LCGs in the UL MAC PDU.

8. The method of claim 1, further comprising:
when an UL transmission including ultra-reliable low-latency communication (URLLC) data overlaps in time domain a SL transmission including a physical sidelink feedback channel (PSFCH) or a physical sidelink broadcast channel (PSBCH),
prioritizing the SL transmission including the PSFCH or the PSBCH over the UL transmission including the URLLC data when the PSFCH or the PSBCH is associated with URLLC SL data having a highest priority of LCHs including data in the URLLC SL data that is higher than a SL URLLC prioritization threshold,
prioritizing the UL transmission including the URLLC data over the SL transmission including the PSFCH or the PSBCH when the PSFCH or the PSBCH is associated with URLLC SL data having a highest priority of LCHs including data in the URLLC SL data that is lower than the SL URLLC prioritization threshold, and
prioritizing the UL transmission including the URLLC data over the SL transmission including the PSFCH or the PSBCH when the PSFCH or the PSBCH is associated with non-URLLC SL data.

9. The method of claim 1, further comprising:
prioritizing an UL transmission including a MAC protocol data unit (PDU) over a SL transmission overlapping the UL transmission in time domain when the MAC PDU includes one of:
an UL BSR MAC CE,
a SL BSR MAC CE,
a power headroom report (PHR) MAC CE,
a common control channel (CCCH) service data unit (SDU),
a radio resource control (RRC) message,
a signaling radio bearer (SRB) message,
a C-RNTI MAC CE,
a third message (Msg3) of a random access process,
a first message (MsgA) of a 2-step random access procedure,
a beam failure recovery request (BFRQ) for a secondary cell MAC CE,
a configured grant confirmation MAC CE, or
a sidelink configured grant confirmation MAC CE.

10. The method of claim 1, further comprising:
triggering a SL scheduling request (SR) for a SL BSR triggered by a SL LCH when an available UL resource has a physical uplink shared channel (PUSCH) transmission duration longer than a maximum PUSCH duration configured for the SL LCH triggering the SL BSR.

11. The method of claim 1, wherein a priority of an Ul SR equals a priority of an UL LCH triggering the UL SR for prioritizing between the UL SR and a SL transmission.

12. The method of claim 1, wherein a priority of a SL SR equals a priority of a SL LCH triggering the SL SR for prioritizing between the SL SR and a SL transmission, or for prioritizing between the SL SR and an UL transmission.

13. A apparatus, comprising circuitry configured to:
receive an uplink (UL) prioritization threshold and a sidelink (SL) prioritization threshold;
determine whether an UL transmission overlaps a SL transmission in time domain;
when the UL transmission overlaps the SL transmission in time domain, determine which of the UL transmission and the SL transmission is to be prioritized according to:
when a highest priority of an UL logical channel(s) (LCH(s)) with UL data available for the UL transmission is lower than a priority corresponding to the UL prioritization threshold, and a highest priority of a SL LCH(s) with SL data available for the SL transmission is higher than a priority corresponding to the SL prioritization threshold, prioritizing the SL transmission over the UL transmission,
when the highest priority of the UL LCH(s) with the UL data available for the UL transmission is higher than the priority corresponding to the UL prioritization threshold, prioritizing the UL transmission over the SL transmission, and
when the highest priority of the SL LCH(s) with the SL data available for the SL transmission is lower than the priority corresponding to the SL prioritization threshold, prioritizing the UL transmission over the SL transmission; and
perform one of the UL transmission and the SL transmission that is prioritized.

14. The apparatus of claim 13, wherein the circuitry is further configured to:
when the highest priority of the UL LCH(s) with the UL data available for the UL transmission is higher than the priority corresponding to the UL prioritization threshold, classify the UL data available for the UL transmission into UL data class 1;
when the highest priority of the UL LCH(s) with the UL data available for the UL transmission is lower than the priority corresponding to the UL prioritization threshold, classify the UL data available for the UL transmission into UL data class 2;
When the highest priority of the SL LCH(s) with the SL data available for the SL transmission is higher than the priority corresponding to the SL prioritization threshold, classify the SL data available for the SL transmission into SL data class 1;
When the highest priority of the SL LCH(s) with the SL data available for the SL transmission is lower than the priority corresponding to the SL prioritization threshold, classify the SL data available for the SL transmission into SL data class 2; and
determine which of the UL transmission and the SL transmission is to be prioritized according to priorities of the UL data and the SL data that are determined based on the following priority order where the highest priority is listed first:
data belonging to UL data class 1,
data belonging to SL data class 1,
data belonging to UL data class 2, and
data belonging to SL data class 2.

15. The apparatus of claim 13, wherein priorities of the UL LCHs with the UL data available for the UL transmission are represented by values with a lower value corresponding to a higher priority, and priorities of the SL LCHs with the SL data available for the SL transmission are represented by values with a lower value corresponding to a higher priority.

16. The apparatus of claim 13, wherein the determining which of the UL transmission and the SL transmission is to be prioritized includes:
when a value of the highest priority of the UL LCH(s) with the data available for the UL transmission is higher than the UL prioritization threshold, and a value of the highest priority of the SL LCHs with the data available for the SL transmission is lower than the SL prioritization threshold, prioritizing the SL transmission over the UL transmission; and when the value of the highest priority of the UL LCHs with the data available for the UL transmission is lower than the UL prioritization threshold, or the value of the highest priority of the SL LCHs with the data available for the SL transmission is higher than the SL prioritization threshold, prioritizing the UL transmission over the SL transmission.

17. The apparatus of claim 13, wherein data from a SL control channel (SCCH) is prioritized over data from a SL traffic channel (STCH) for allocation of sidelink resources among the SL LCH(s).

18. The apparatus of claim 13, where the circuitry is further configured to:
when both an UL buffer status report (BSR) and a SL BSR are triggered, classify a SL logical channel group (LCG) as a prioritized SL LCG when a highest priority of one or more LCHs that belong to the SL LCG and have data available for transmission is higher than the priority corresponding to the SL prioritization threshold; and
when a highest priority of one or more LCHs that belong to one or more UL LCGs having buffer status to be reported and have data available for transmission is lower than the priority corresponding to the UL prioritization threshold, prioritize buffer status reporting of the prioritized SL LCG over buffer status reporting of the one or more UL LCGs.

19. The apparatus of claim 13, where the circuitry is further configured to:
include a SL-BSR medium access control (MAC) control element (CE) containing buffer status of the prioritized SL LCG in an UL MAC PDU; and
include an UL-BSR MAC CE containing all or a subset of buffer status of the one or more UL LCGs in the UL MAC PDU.

20. A non-transitory computer-readable medium storing instructions that, when executed by a processor, cause the processor to perform a method, the method comprising:
receiving an uplink (UL) prioritization threshold and a sidelink (SL) prioritization threshold at a user equipment (UE);
determining whether an UL transmission overlaps a SL transmission in time domain;
when the UL transmission overlaps the SL transmission in time domain, determining which of the UL transmission and the SL transmission is to be prioritized according to:
when a highest priority of an UL logical channel(s) (LCH(s)) with UL data available for the UL transmission is lower than a priority corresponding to the UL prioritization threshold, and a highest priority of a SL LCH(s) with SL data available for the SL transmission is higher than a priority corresponding to the SL prioritization threshold, prioritizing the SL transmission over the UL transmission,
when the highest priority of the UL LCH(s) with the UL data available for the UL transmission is higher than the priority corresponding to the UL prioritization threshold, prioritizing the UL transmission over the SL transmission, and
when the highest priority of the SL LCH(s) with the SL data available for the SL transmission is lower than the priority corresponding to the SL prioritization threshold, prioritizing the UL transmission over the SL transmission; and
performing one of the UL transmission and the SL transmission that is prioritized.

* * * * *